April 14, 1936. H. F. JOHNSON Re. 19,927

METHOD AND MACHINE FOR FORMING CHANNEL SHAPED ARTICLES

Original Filed Aug. 13, 1931 3 Sheets-Sheet 1

Inventor
Howard F. Johnson
Kuns Hudson & Kent
attys.

METHOD AND MACHINE FOR FORMING CHANNEL SHAPED ARTICLES

Original Filed Aug. 13, 1931 3 Sheets-Sheet 2

Inventor
Howard F. Johnson
Kerr, Hudson & Kent
attys

April 14, 1936. H. F. JOHNSON Re. 19,927
METHOD AND MACHINE FOR FORMING CHANNEL SHAPED ARTICLES
Original Filed Aug. 13, 1931 3 Sheets-Sheet 3
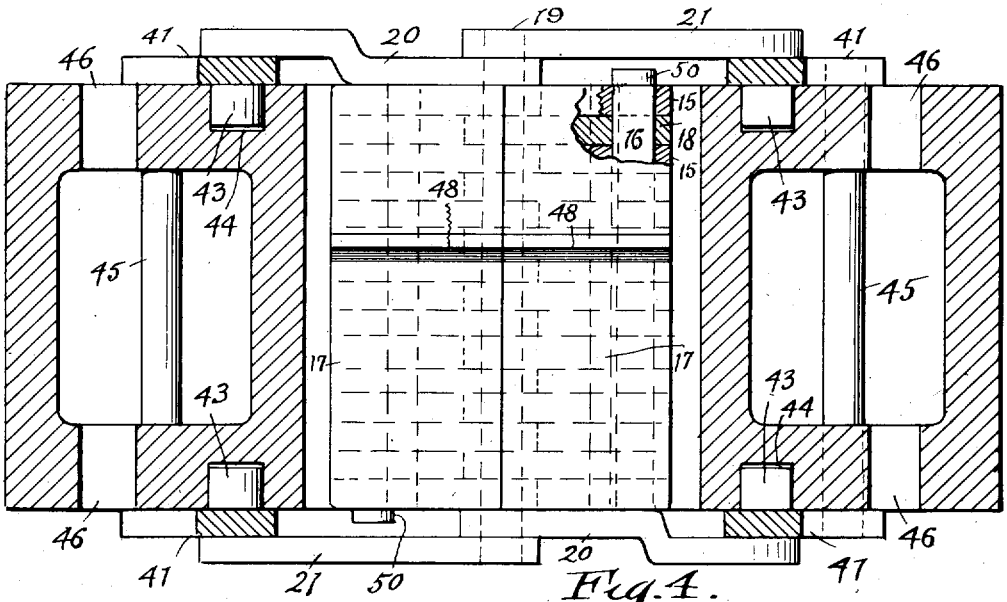
Fig. 4.
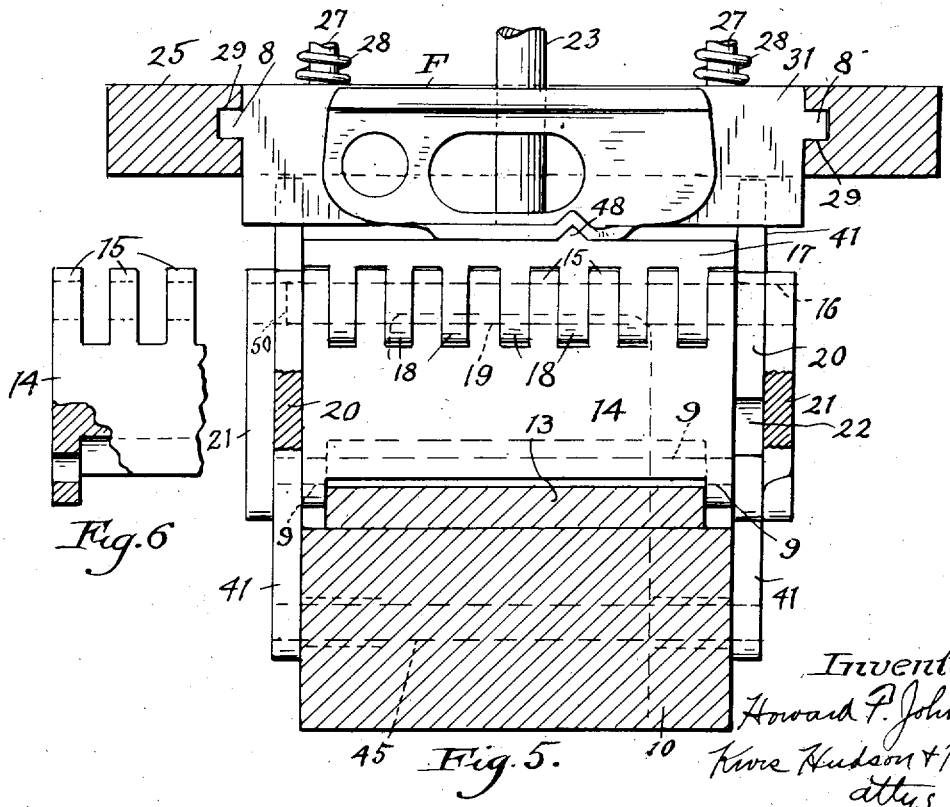
Fig. 6
Fig. 5.
Inventor
Howard F. Johnson
Kure Hudson & Kent
attys.

Reissued Apr. 14, 1936 Re. 19,927

UNITED STATES PATENT OFFICE 19,927

METHOD AND MACHINE FOR FORMING CHANNEL SHAPED ARTICLES

Howard F. Johnson, Cleveland, Ohio, assignor to The Champion Machine & Forging Company, Cleveland, Ohio, a corporation of Ohio Original No. 1,984,020, dated December 11, 1934, Serial No. 556,828, August 13, 1931. Application for reissue February 28, 1936, Serial No. 66,288

22 Claims. (Cl. 153—13)

This invention relates to a method of forming channel-shaped articles and improvements in forming machines, having reference particularly to a press for shaping, squaring up, and dimensioning forgings.

One of the objects of the invention is the provision of a novel press adapted to combine into one operation bending and finishing steps heretofore performed separately.

Another object is the provision of novel mechanism for squaring up and dimensioning both surfaces of two side walls of a forging simultaneously.

Another object is the provision of a machine of the character referred to provided with novel mechanism for controlling the lateral movements of a pair of outer dies during the bending of the forging, so as to keep the outer dies out of the way while the walls of the forging are being folded up, and so as to project these dies into position to be acted upon by the inclined actuating blocks when the bending operation is completed.

A further object of the invention is the provision of a novel method of forming channel-shaped objects from a blank having a body portion comprising a middle concavo-convex part and other parts arranged at a predetermined angle with a minimum number of operations.

Other objects and features of novelty will appear as I proceed with a description of that embodiment of the invention which, for the purposes of the present application, I have illustrated in the accompanying drawings, in which Figure 1 is a central vertical section of a press embodying the invention, with a forging in place therein ready to be operated upon.

Fig. 4 is a horizontal sectional view taken approximately upon the line 4—4 of Fig. 2.

Fig. 5 is a vertical sectional view taken substantially on the line 5—5 of Fig. 2, and Fig. 6 is a fragmental detail view, partly in section, of one leg of a hinged table employed in connection with the invention.

Figure 1:
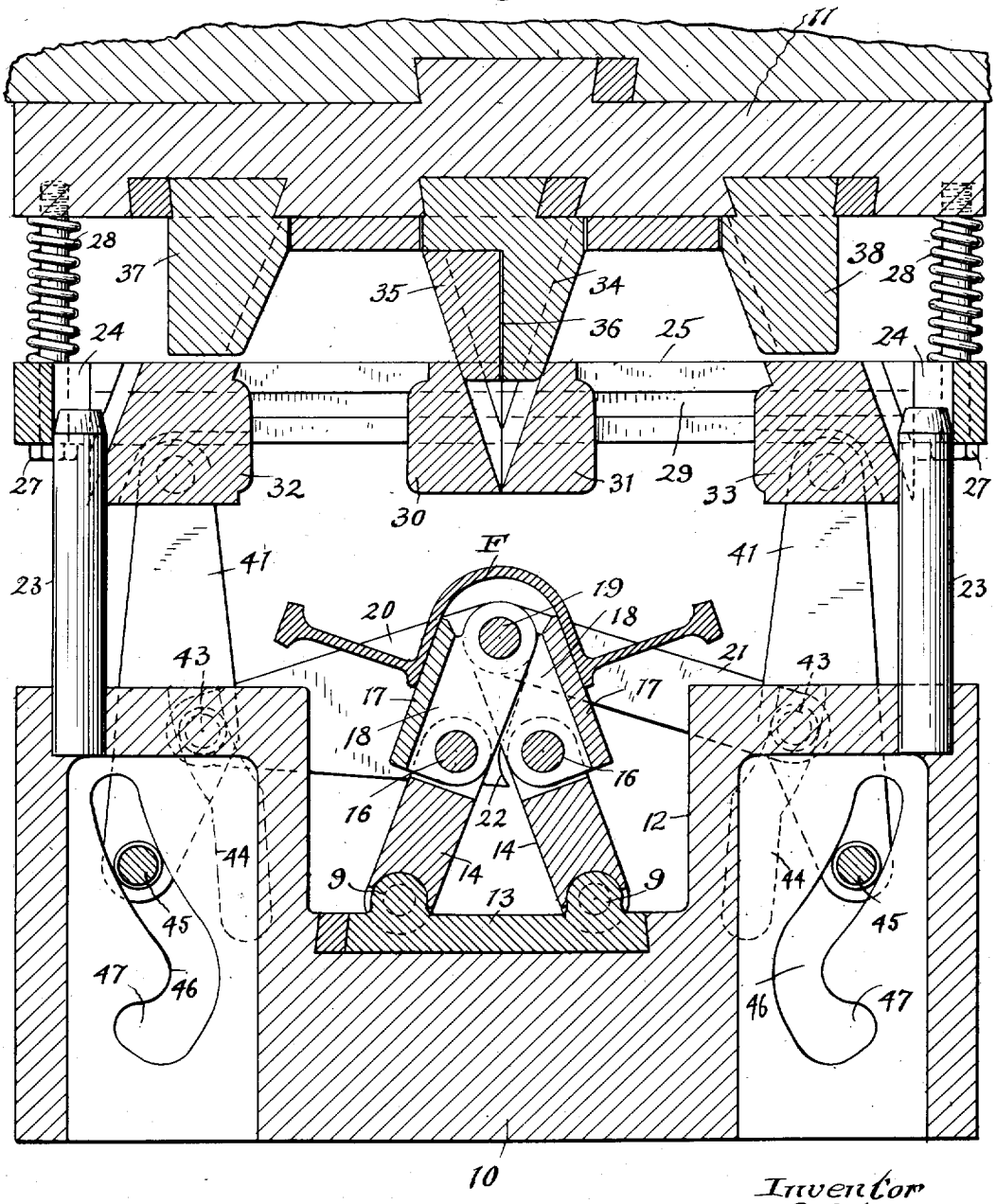
Figure 2:
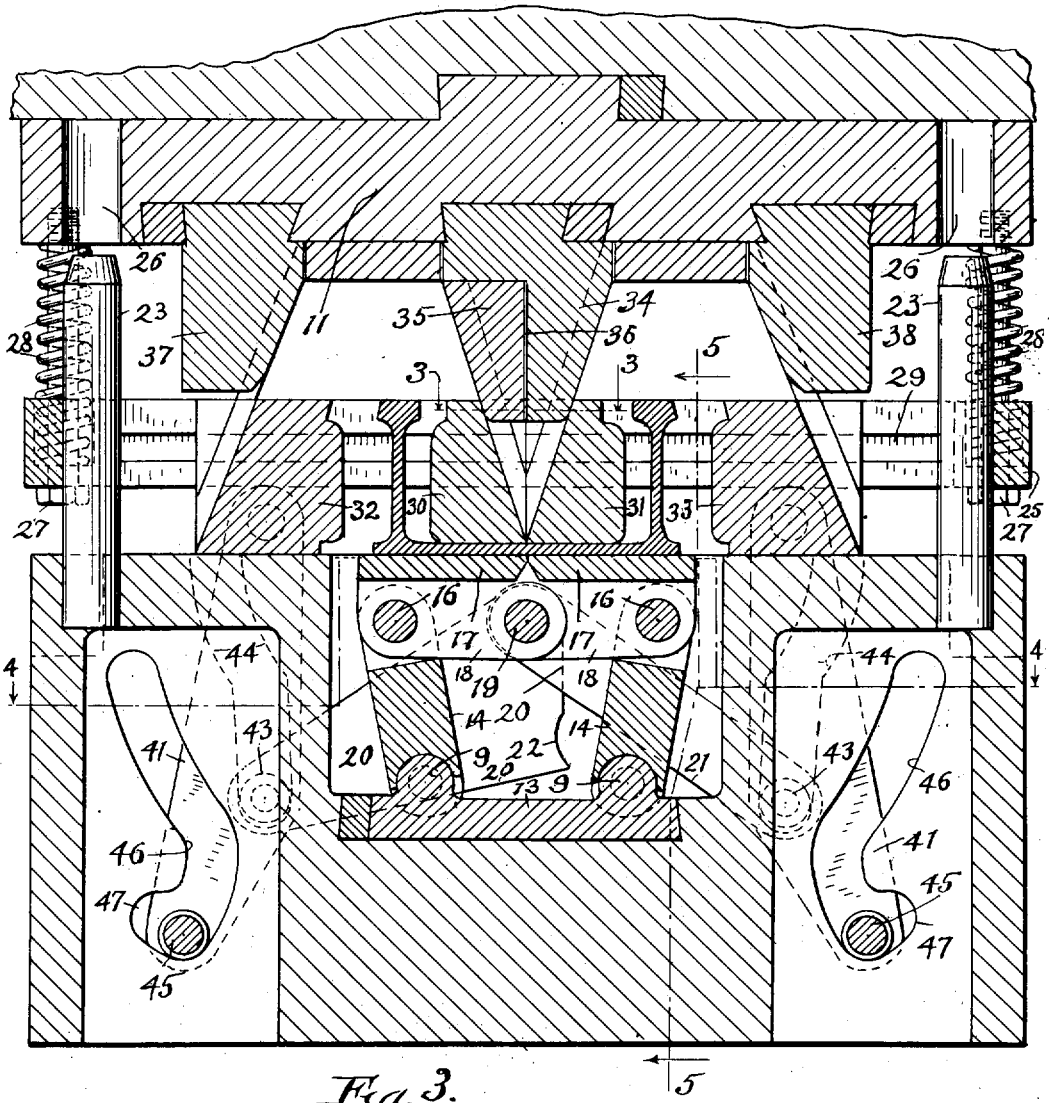
Fig. 2 is a similar view with the parts in the positions which they occupy when the base of the forging has been bent into final shape and before the dies have advanced laterally for squaring up the side walls.

In the drawings, 10 represents a base member which is adapted to be mounted in any suitable press. 11 is a bolster that is adapted to be raised and lowered in the operation of the press. The base is provided with a recess 12, at the bottom of which there is mounted an anchor plate 13. Upon this plate there are pivotally mounted at 9 two flat legs 14, extending practically across the recess 12. Along their upper edges these legs are formed with spaced lugs 15 having holes bored therethrough for the reception of pivot pins 16. Upon the legs 14 there is mounted an expansible member or die in the form of a hinged table, having two table top sections 17 that are provided with ribs 18 on their lower surfaces. These ribs interfit when the table is folded, as shown in Fig. 1, and fit between the lugs 15 on the upper ends of the legs 14. Each of the ribs 18 is provided with two round holes for the reception of the pivot pins 16 and for the reception of a central hinge pin 19, by means of which the two table sections are joined together. When the machine is at rest the hinged table stands in the contracted or collapsed condition illustrated in Fig. 1, and in this condition is adapted to receive a forging F having a crowned base and a pair of outwardly inclined side walls. The final product is substantially channel-shaped, as indicated in Fig. 2, but because of the fact that it would be impossible to forge it directly in that shape, it is formed to the shape shown in Fig. 2 and then bent up in the machine here disclosed to make the base flat, as more specifically described in copending application Serial No. 541,154, filed June 1, 1931, by George H. Stegkemper and myself jointly.

At each end of the hinge pin 19 there are mounted two links 20 and 21 to turn freely upon the hinge pin. Link 21 has parallel edges, but link 20 is substantially triangular, so as to have a portion 22 that is adapted to engage with one of the pivot pins 16 when the outer ends of the links swing downward, whereby the pivot pin 16 is urged outwardly away from the line of centers 19, 16, 9.

Two or more dowel pins 23 project upwardly from the base 10, being adapted to receive correspondingly curved sockets 24 in the end bars of a rectangular frame 25, whereby the frame is guided in its movements. These dowel pins 23 are also adapted to extend into guiding holes 26 in the bolster 11. The frame 25 is suspended from bolster 11 by means of four headed bolts 27 which extend loosely through holes in the frame 25 and are threaded into the bolster, the heads of the bolts engaging against the under surface of the frame. Surrounding the bolts 27 are coil springs 28 that tend to hold the bolster 11 and frame 25 apart.

The side bars of the frame 25 are formed with horizontal guide slots 29, within which slide tongues 8 on the ends of dies 30, 31, 32 and 33. The dies 30 and 31 on their outer faces and the dies 32 and 33 on their inner faces are formed with surfaces complementary to the desired surfaces on the side walls of the forging F, as will be seen from the drawings. The inner surfaces of dies 30 and 31 and the outer surfaces of dies 32 and 33 are inclined for cooperation with wedging surfaces carried by the bolster 11, and now to be described.

The bolster 11 has mounted therein a central wedge comprising two elements 34 and 35 separated by shims 36, by which means the width of the wedge may be controlled within certain limits. The two elements 34 and 35 may be secured together by any suitable means. The wedge is adapted to fit between the dies 30 and 31 and to engage their inclined faces for the purpose of spreading the dies and causing their working faces to engage the inner side walls of the forging. The bolster 11 also supports die actuating blocks 37 and 38 that have inclined surfaces for engagement with the inclined surfaces of the dies 32 and 33 respectively, for the purpose of sliding those dies inwardly to engage the outer walls of the forging.

Figure 3:
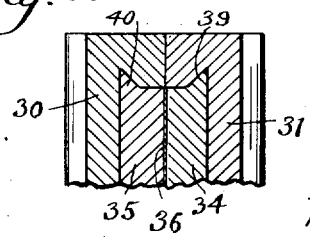
Fig. 3 is a cross sectional detail view, taken substantially on the line 3—3 of Fig. 2.

As shown in Fig. 3, the ends of the wedge members 34 and 35 are formed with ribs 39 and 40, which take into correspondingly shaped grooves in the dies 31 and 30 respectively. By virtue of this arrangement the wedge serves not only to separate the dies 30 and 31 when it descends, but when it rises it draws the dies together. The complementary inclined surfaces on the dies 32 and 33 and on the blocks 37 and 38 have similar ribs and grooves, so that the dies 32 and 33 are retracted to the positions illustrated in Fig. 2 when the blocks 37 and 38 are raised to the positions shown in that figure. It will be noted that the wedge 34, 35 never leaves engagement with the dies 30, 31, but that the blocks 37 and 38 are withdrawn entirely from engagement with the dies 32 and 33, leaving those dies free to move laterally with regard to the actuating blocks.

In the two outer ends of each of the dies 32 and 33 levers 41 are pivotally hung. Each of these levers carries intermediate its end a trunnion 43, which runs in a cam groove 44 formed in the base 10. Preferably each trunnion carries an anti-friction roller for engagement with the walls of its groove. The outer ends of each of the links 20 and 21 are also connected with the respective trunnions 43, which come to rest at the lower ends of the grooves 44 when the hinged table is in its horizontal or open position, shown in Fig. 2.

The lower ends of each pair of levers 41 are connected together by a rod 45 which runs in cam grooves 46 formed in the sides of the base. At their lower extremities these grooves are widened or up-turned as illustrated at 47 to permit the swinging of the levers 41 about the trunnions 43 as fulcrums, when the latter are resting in the lower ends of grooves 44. It will be noted from an inspection of Fig. 4 that the arrangement of links 20 and 21 on the two sides of the machine is reversed. This is for the purpose of breaking the dead center position of both of the two pivot pins 16, the link 20 at one side of the machine engaging one of these pivot pins and the corresponding link on the other side of the machine engaging the other one of the pivot pins.

It will be noted also that on the tops of the two table sections 17 there are ribs 48 which come into alignment when the table assumes its expanded or horizontal position, these ribs fitting into a groove in the forging. Other variations in the surfaces of the table sections could of course be employed without departing from the spirit of the invention. In other words, it is not essential that the table be so formed that lines upon its surface in planes parallel to the hinge pin 19 should be straight lines. They may be curved or broken as desired, or as necessary to conform to the surface of the forging to be treated.

*Operation.*—Assuming that a heated forging has been positioned as shown at F in Fig. 1, the operator causes the press to be set in motion to lower the bolster 11. As the latter descends it acts through springs 28 to push downward at the same speed the frame 25 carrying the four dies. The two dies 30, 31 remain adjacent each other, and contact with the crowned part of the forging F. At about the same time the trunnions 43, moving inwardly and downwardly along the grooves 44, rock the two links 20 upon their pivots 19, causing the portions 22 of the links to engage the heads 50 upon the pins 16 (see Fig. 4), thereby moving these pins out of dead center position.

The springs 28 are stiff enough to transmit pressure sufficient to bend the base of the forging. Hence the bolster 11 and the frame 25 remain in the relative positions illustrated in Figs. 1 and 2, as they descend. While the forging is being bent and the hinged table is moving toward its open or expanded position, causing the walls of the forging to fold up, the levers 41 descend without transmitting any considerable lateral movement to the dies 32. Hence there is no interference with the upward swinging of the walls of the forging. As the base of the forging approaches a flattened-out condition, however, the rods 45 begin to be deflected outwardly by the cam grooves 46, thereby swinging the levers 41 about the trunnions 43 as fulcrums, and sliding the dies 32 inwardly from the positions shown in Fig. 1 to those shown in Fig. 2. By the time the base of the forging is completely flattened, the trunnions 43 have reached the lower ends of grooves 44, so that the links 20 and 21 form pairs of toggle links for the support of the two ends of the hinge pin 19. The various parts of the machine are then in the condition illustrated in Fig. 2.

Further downward movement of the bolster 11 acts to compress springs 28, and to force the wedge 34, 35 and actuating blocks 37 and 38 downwardly, their inclined surfaces engaging the similarly inclined surfaces of the dies 30, 31, 32 and 33, moving the dies 30 and 31 outwardly and the dies 32 and 33 inwardly until they are all pressed strongly against the side walls of the forging, while the table 17 and the wear plates on the bolster 11 engage the bottom and top of the forging, thus squaring up the walls and imparting accuracy and finish to the forging. The levers 41 offer no resistance to the inward sliding movement of the dies 32 and 33, because the slots 46 are relieved as shown at 47 to permit the rods 45 to swing upwardly.

When the bolster has descended to the limit of its movement, it is caused to rise, whereupon the rib and groove connection between the four dies and the four actuating parts 34, 35, 37 and 38 cause the middle dies to move again toward each other and the outer dies to move back away from the forging, this relative movement between the dies and actuating elements being effected by the expansion of springs 28.

As soon as the parts have again assumed the positions illustrated in Fig. 2, the bolster 11 and frame 25 again move equally in the upward direction, the frame being drawn upwardly by the bolts 27, whereby the frame and the dies carried thereby are moved upwardly out of the way of the forging, and the latter is then removed from the machine.

As the frame 25 moves upwardly it draws levers 41 upwardly, and the trunnions 43 thereon transmit upward motion to the links 20 and 21, thereby raising the hinge pin 19 and folding the table sections 17 with the legs 14 thereof into the condition shows in Fig. 1. At the same time the rods 45, moving upwardly in the slots 46, swing the levers 41 upon the trunnions 43 in such manner as to again draw the dies 32 and 33 outwardly along the guide slots 28 to the position illustrated in Fig. 1. The machine is then ready for the next operation.

The general arrangement of parts illustrated in the accompanying drawings has certain advantages. However it will be appreciated that the entire mechanism could be inverted without departing from the spirit of the invention.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a press for shaping and finishing forgings, a two-part table hanged at the joint, means tending to hold the table folded in an inverted V condition, a two-part plunger positioned above said table, means for lowering said plunger to engage a forging positioned upon the folded table to flatten out the forging and the table, and means for spreading apart the elements of the two-part plunger after the table has assumed is flattened position.

2. In a press for shaping and finishing a forging having an arcuate base and two side walls extending outwardly at an angle to each other, means for bending the arcuate base to cause the sides to stand parallel to each other, a pair of dies positioned outwardly beyond the range of movement of the sides of the forging during the bending of its base, and means for moving said dies into pressure engagement with said sides after the bending movement is completed.

3. In a press for shaping and finishing a forging having a crowned base and two side walls extending outwardly at an angle to each other, means for bending up the crowned base to cause the sides to stand parallel to each other, a pair of outer dies having faces complementary to the outer faces of the forging, levers pivoted to the dies and movable with the bending means, and guides for said levers for holding said dies outwardly beyond the range of movement of the forging sides during the bending of the base, the lever guides being adapted to permit the inward movement of the dies after the bending of the base is completed.

4. In a machine of the class described, a base, a laterally slidable and vertically movable die, a vertically movable actuating block, said die and block having cooperating inclined faces whereby relative movement of the block and die vertically produces movement of the die laterally, a lever pivotally connected with said die, camming means acting upon said lever during the vertical movement of the die for controlling the lateral movement of the die, said camming means leaving the die free thereafter to move laterally in response to vertical movements of said actuating block.

5. In a machine of the class described, a two-part hinged table adapted to assume either an inverted V folded condition or a flat condition, pairs of links pivoted to the ends of the table hinge, means for supporting the outer ends of said links with the latter in inclined positions when the table is in flat condition, whereby toggle link supports are formed for the hinge, and means for raising the outer ends of said links to bring the table into folded condition.

6. In a machine of the class described, a base, a two-part hinged table adapted to assume either an inverted V or a flat open condition, legs hinged to the table sections and to the base, pairs of links pivoted to the ends of the hinge, means for supporting the outer ends of said links with the links in inclined position when the table is open, whereby toggle link supports are formed for the hinge, and means for raising the outer ends of said links to bring the table into folded condition, one of said links being adapted to engage the hinge connection between the table and one of said legs when the outer end of the link is lowered from its upper position, whereby the said connection is shifted from a dead center position.

7. In a machine of the class described, a hinged table adapted to receive a crowned forging, a bolster carrying depending wedging members, a frame mounted beneath the bolster to slide vertically with respect thereto, dies having working faces to engage the sides of the forging and inclined rear faces for engagement with said wedging members, said dies being horizontally slidable in said frame, and yieldable means for transmitting pressure from said bolster to said frame by means of which the dies are caused to bend the forging and open the hinged table before any appreciable relative movement between the bolster and frame takes place.

8. In a machine for forming a forging having a base and two side walls, a table upon which the forging is to be supported, a bolster movable toward and away from said table, a pair of dies carried by said bolster adapted to take position within the side walls of the forging, the adjacent faces of said dies being inclined upwardly and outwardly, a pair of dies carried by said bolster adapted to take position outwardly of said side walls having outer faces inclined upwardly and inwardly, a wedge carried by said bolster adapted to engage the inclined faces of said inner dies, a pair of inclined blocks carried by said bolster adapted to engage the inclined surfaces of said outer dies, and means permitting relative vertical movement between said wedge and blocks on the one hand and said dies on the other hand, whereby the inner dies are moved outwardly and the outer dies are moved inwardly for pressure engagement with said walls of the forging when the bolster moves toward said table.

9. A machine for forming a channel shaped article from a blank having an arcuate concavo-convex body portion and a plurality of lateral flanges on the convex side thereof, comprising a member for engaging the convex side of said body portion, an expansible member for engaging the concave side of said body portion, and means for producing relative movement between said members whereby said body portion is flattened against said first mentioned member.

10. A machine for forming a channel shaped article from a blank having an arcuate concavo-convex body portion and a plurality of lateral flanges on the convex side thereof comprising a member for engaging the convex side of said body portion, a plurality of members pivotally connected together for engaging the concave side of said body portion with the axis of the pivot positioned in the cavity of the concave side, and means for moving said members about their pivotal axis whereby said body portion is flattened against said first mentioned member.

11. A machine for forming a channel shaped article having a body portion and lateral flanges on one side of the body portion with portions of said lateral flanges overhanging said body portion, from a blank having an arcuate concavo-convex body portion and a plurality of lateral flanges on the convex side thereof, comprising a collapsible member for engaging the convex side of said body portion, an expansible member for engaging the concave side of said body portion, means for producing relative movement between said members whereby said concavo-convex body portion is flattened against said collapsible member and the lateral flanges paralleled, and means for collapsing said collapsible member whereby the formed member may be removed.

12. A machine for forming a channel shaped article having a body portion and lateral flanges on one side of the body portion with portions of said lateral flanges overhanging said body portion, comprising a collapsible die for engaging the interior of said channel shaped article, relatively movable dies for engaging the exterior of said lateral flanges, means for producing relative movement between said last mentioned dies, and means for collapsing said collapsible die whereby the finished channel shaped article may be removed therefrom.

13. A machine for forming a channel shaped article having a body portion and lateral flanges on one side of the body portion with portions of said lateral flanges overhanging said body portion, from a blank having an arcuate concavo-convex body portion and a plurality of lateral flanges on the convex side thereof, comprising a collapsible member for engaging the convex side of said body portion, means for flattening said body portion against said collapsible member, relatively movable dies for engaging the exterior of said lateral flanges, means for producing relative movement between said last mentioned dies, and means for collapsing said collapsible die whereby the finished channel shaped article may be removed therefrom.

14. A machine for forming a channel shaped article having a body portion and lateral flanges on one side of the body portion with inwardly extending projections overhanging said body portion, from a blank having an arcuate concavo-convex body portion and a plurality of lateral flanges on the convex side thereof with projections extending in the same direction as the crest of the convex body portion, comprising a collapsible member for engaging the convex side of said body portion, an expansible member for engaging the concave side of said body portion, means for producing relative movement between said members whereby said concavo-convex body portion is flattened against said collapsible member and said lateral flanges paralleled, a plurality of rectilinearly reciprocable dies for engaging the exterior of said lateral flanges, means for reciprocating said rectilinearly reciprocable dies in predetermined timed relation to the said relative movement between said collapsible member and said expansible member, and means for collapsing said collapsible member whereby the formed article may be removed from the machine.

15. The method of forming a channel shaped article having a body portion and lateral flanges on one side of the body portion with portions of said lateral flanges overhanging said body portion, from a blank having an arcuate concavo-convex body portion, and a plurality of lateral flanges on the convex side thereof, which comprises engaging the convex side of the body portion against a collapsible die member, flattening the body portion against said die member to position the lateral flanges in parallel relationship, and subsequently collapsing said die member to disengage the work therefrom.

16. In a machine for forming a forging having a base and two side walls, a table upon which the forging is to be supported, a bolster movable toward and away from said table, a pair of dies carried by said bolster adapted to take position within the side walls of the forging, the adjacent faces of said dies being inclined upwardly and outwardly, a wedge carried by said bolster adapted to engage the inclined faces of said inner dies, a pair of dies adapted to take position outwardly of said side walls, said outer dies having outer faces inclined upwardly and inwardly, a pair of inclined blocks mounted on the bolster adapted to act upon the inclined faces of the outer dies, and means for producing relative vertical movement between said wedge and said inner dies, whereby the movement of the bolster toward the table positions the inner dies between the side walls of the forging, and forces the inner dies outwardly and the outer dies inwardly for pressure engagement with the side walls of the forging.

17. A machine for forming a channel shaped article from a blank having an arcuate concavo-convex body portion and a plurality of lateral flanges on the convex side thereof, comprising a member for engaging the convex side of said body portion, an expansible member for engaging the concave side of said body portion, means for producing relative movement between said members whereby said body portion is flattened against said first mentioned member, and means for expanding said expansible member in predetermined timed relation to said relative movement independent of force transmitted through the work.

18. A machine for forming channel shaped articles from a blank having a concavo-convex body portion and a pair of lateral flanges on the convex side thereof, comprising a member having a flat surface for engaging the convex side of the body portion, an expansible member for engaging the concave side of the body portion, said expansible member comprising two table sections hinged together at their upper ends, a pivot pin for the lower end of each of said table sections, each of said sections having a bearing surface parallel to the line of centers of its hinge and pivot pins but spaced outwardly therefrom and means for causing said members to approach each other and for expanding said table sections by movement of said pivot pins outwardly until said bearing surfaces come into the same plane parallel with the flat surface of said first named member.

19. The method of forming a channel shaped article from a blank having a body portion comprising a middle concavo-convex part and flat outer parts arranged at a predetermined angle, which comprises engaging the convex side of the blank against a flat member, engaging the flat outer parts of the concave side of the blank against expansible members hinged together and having bearing surfaces spaced outwardly from the hinge and arranged at the said predetermined angle in order to fit the blank, and causing said flat member and said expansible members to approach each other and said expansible members to swing upon their hinge, whereby the bearing surfaces of the expansible members gradually approach each other while sliding upon the flattening concave part of the blank.

20. In a machine for forming a forging having a base and two side walls, a table upon which the forging is to be supported, a bolster movable toward and away from said table, a pair of dies adapted to take position within the side walls of the forging, the adjacent faces of said dies being inclined upwardly and outwardly, a wedge carried by said bolster adapted to engage the inclined faces of said inner dies, means for producing relative vertical movement between said wedge and said dies, whereby the movement of the bolster toward the table forces the dies outwardly after they engage the base of the forging, and abutments carried by the bolster adapted to take position outside the walls of the forging, and against which the forging side walls are pressed by the horizontally moving dies.

21. In a machine for forming a forging having a base and two side walls, a table upon which the forging is to be supported, a bolster movable toward and away from said table, a pair of dies adapted to take position within the side walls of the forging, the adjacent faces of said dies being inclined upwardly and outwardly, a wedge carried by said bolster adapted to engage the inclined faces of said inner dies, means for producing relative vertical movement between said wedge and said dies, whereby the movement of the bolster toward the table forces the dies outwardly after they engage the base of the forging, a pair of outer dies adapted to engage the outer surfaces of the walls of the forging, and abutments for the outer sides of the outer dies carried by said bolster, said outer dies and abutments together forming back stops against which the forging side walls are pressed by the horizontally moving inner dies.

22. In a machine for forming a forging having a base and two side walls, a table upon which the forging is to be supported, a bolster movable toward and away from said table, said bolster carrying a central depending wedge and two outer depending abutments all rigidly connected, a pair of dies adapted to take position within the side walls of the forging, the adjacent faces of said dies being inclined upwardly and outwardly at the same angles as the faces of said wedge and adapted to be engaged simultaneously by said wedge, a pair of dies adapted to engage the outer surfaces of the side walls of the forging and adapted to be engaged in turn by said abutments, whereby as the bolster descends the inner dies are moved outward pressing the side walls of the forging between the inner and outer dies, the pressure exerted by the wedge being opposed by said abutments.

HOWARD F. JOHNSON.